(12) United States Patent
Seol et al.

(10) Patent No.: US 11,075,411 B2
(45) Date of Patent: Jul. 27, 2021

(54) PROTECTION CIRCUIT MODULE, BATTERY PACK, AND METHOD OF MANUFACTURING THE BATTERY PACK

(71) Applicant: SAMSUNG SDI CO., LTD., Yongin-si (KR)

(72) Inventors: Jihwan Seol, Yongin-si (KR); Sundaraaman K.V, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 355 days.

(21) Appl. No.: 15/666,833

(22) Filed: Aug. 2, 2017

(65) Prior Publication Data

US 2018/0069269 A1 Mar. 8, 2018

(30) Foreign Application Priority Data

Sep. 7, 2016 (KR) .................. 10-2016-0115088

(51) Int. Cl.
| | |
|---|---|
| *H01M 10/42* | (2006.01) |
| *H01M 50/502* | (2021.01) |
| *H01M 50/70* | (2021.01) |
| *H01M 50/20* | (2021.01) |
| *H01M 10/48* | (2006.01) |
| *H02H 7/18* | (2006.01) |

(52) U.S. Cl.
CPC ....... *H01M 10/425* (2013.01); *H01M 10/482* (2013.01); *H01M 50/20* (2021.01); *H01M 50/502* (2021.01); *H01M 50/70* (2021.01); *H02H 7/18* (2013.01); *H01M 2010/4271* (2013.01); *H01M 2200/00* (2013.01)

(58) Field of Classification Search
CPC .. H01M 10/425; H01M 2/1016; H01M 2/202; H01M 2/38; H01M 10/482; H01M 7/18; H01M 2010/4271; H01M 2200/00
See application file for complete search history.

(56) References Cited

U.S. PATENT DOCUMENTS

| | | | |
|---|---|---|---|
| 8,680,810 B1 * | 3/2014 | Okandan | H01M 10/0436 320/107 |
| 9,184,472 B2 | 11/2015 | Hong | |
| 10,003,105 B2 | 6/2018 | Cho et al. | |
| 2002/0106903 A1 * | 8/2002 | Kurita | H01L 21/4864 438/707 |

(Continued)

FOREIGN PATENT DOCUMENTS

| | | | |
|---|---|---|---|
| CN | 205921415 U | * | 2/2017 |
| JP | 2015-021834 A | | 2/2015 |

(Continued)

OTHER PUBLICATIONS

English machine translation of Zhaohui et al. (CN 205921415 U)( (Year: 2017).*
Korean Office action dated Aug. 20, 2020.

*Primary Examiner* — Brian R Ohara
(74) *Attorney, Agent, or Firm* — Lee IP Law, P.C.

(57) ABSTRACT

A protection circuit module includes a plurality of pads respectively and electrically connected to a plurality of battery cells, protection circuit to monitor voltages of the battery cells and to balance of the battery cells, and a plurality of contact pads arranged in a preset order between the pads and the protection circuit.

15 Claims, 4 Drawing Sheets

(56) References Cited

U.S. PATENT DOCUMENTS

| | | | | |
|---|---|---|---|---|
| 2005/0077878 A1* | 4/2005 | Carrier | ............... | H01M 2/1022 |
| | | | | 320/134 |
| 2010/0225275 A1* | 9/2010 | Bucur | .................. | H02J 7/0019 |
| | | | | 320/116 |
| 2013/0002016 A1* | 1/2013 | Furukawa | ........... | H01M 10/425 |
| | | | | 307/9.1 |
| 2014/0377598 A1* | 12/2014 | Reihlen | ................ | H01M 2/202 |
| | | | | 429/50 |
| 2015/0024242 A1* | 1/2015 | Nishiwaki | ............ | G01R 31/385 |
| | | | | 429/90 |
| 2015/0243958 A1 | 8/2015 | Ro et al. | | |
| 2015/0295280 A1* | 10/2015 | Cho | ................. | H01M 10/4207 |
| | | | | 429/158 |
| 2017/0133725 A1* | 5/2017 | Schwindt | ............... | H05K 1/189 |

FOREIGN PATENT DOCUMENTS

| | | | |
|---|---|---|---|
| KR | 10-2007-0108758 A | 11/2007 | |
| KR | 10-2011-0011347 A | 2/2011 | |
| KR | 10-2015-0098721 A | 8/2015 | |
| KR | 10-2015-0117920 A | 10/2015 | |
| WO | WO-2015197311 A1 * | 12/2015 | .......... H01M 10/425 |

* cited by examiner

PROTECTION CIRCUIT MODULE, BATTERY PACK, AND METHOD OF MANUFACTURING THE BATTERY PACK

CROSS-REFERENCE TO RELATED APPLICATION

Korean Patent Application No. 10-2016-0115088, filed on Sep. 7, 2016, and entitled, "Protection Circuit Module, Battery Pack, and Method of Manufacturing the Battery Pack," is incorporated by reference herein in its entirety.

BACKGROUND

1. Field

One or more embodiments described herein relate to a protection circuit module, a battery pack, and a method for manufacturing a battery pack.

2. Description of the Related Art

A variety of electronic devices operate based on battery power. Examples include mobile phones, digital cameras, laptop computers, electric bicycles, and electric vehicles. The battery power is provided from a battery pack having a protection circuit module that monitors the voltage of a plurality of battery cells. A protection circuit in the protection circuit module is electrically connected to the battery cells in a preset order to ensure safe operation of the circuit. The protection circuit may incorrectly monitor the battery for various reasons. As a result, a malfunction may occur.

SUMMARY

In accordance with one or more embodiments, a protection circuit module includes a plurality of pads respectively and electrically connected to a plurality of battery cells; protection circuit to monitor voltages of the battery cells and to balance of the battery cells; and a plurality of contact pads arranged in a preset order between the pads and the protection circuit. Each of the contact pads may include a main contact pad electrically connected to one of the pads; and an auxiliary contact pad spaced apart from the main contact pad and electrically connected to the protection circuit. The main contact pad may be connected to the auxiliary contact pad by welding or soldering. The preset order may be based on an amount of voltage of each of the battery cells applied to the protection circuit. The contact pads may be arranged in a line in the preset order. The protection circuit module may include a connector receiver accommodating a connector having connector pins respectively electrically connected to the battery cells, wherein the connector receiver is electrically connected to each of the pads.

In accordance with one or more other embodiments, a battery pack includes a plurality of battery cells; and protection module, electrically connected to the battery cells, to monitor voltages of the battery cells, the protection module including: protection circuit to balance the battery cells, a plurality of pads respectively and electrically connected to the battery cells; and a plurality of contact pads arranged in a preset order between the pads and the protection circuit. Each of the contact pads may include a main contact pad electrically connected to one of the pads; and an auxiliary contact pad spaced apart from the main contact pad and electrically connected to the protection circuit. The main contact pad may be connected to the auxiliary contact pad by welding or soldering.

The preset order may be based on an amount of voltage of each of the battery cells applied to the protection circuit. The contact pads may be arranged in a line in the preset order. The battery pack may include a connector having a plurality of connector pins respectively electrically connected to the battery cells; and a connector receiver electrically connected to each of the pads and accommodating the connector. The contact pads may be arranged in a conductive metal pattern.

In accordance with one or more other embodiments, a method for manufacturing a battery pack includes preparing a protection module including contact pads, each of the contact pads including a main contact pad and an auxiliary contact pad arranged in a preset order and connected to a plurality of battery cells, the protection module including protection circuit; assembling the battery cells and the protection module by respectively electrically connecting the pads and the battery cells; and electrically connecting the main contact pad and the auxiliary contact pad in a preset direction.

The method may include transferring a voltage applied to the pads to the protection circuit when the main contact pad and the auxiliary contact pad are electrically connected to each other. Assembling the battery cells and the protection circuit module may include withholding transfer of the voltage of each of the battery cells to the protection circuit when the pads are respectively connected to the battery cells. Electrically connecting the main contact pad and the auxiliary contact pad may include applying the voltage to the protection circuit in a preset order when the main contact pad and the auxiliary contact pad are electrically connected in the preset direction.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 1:
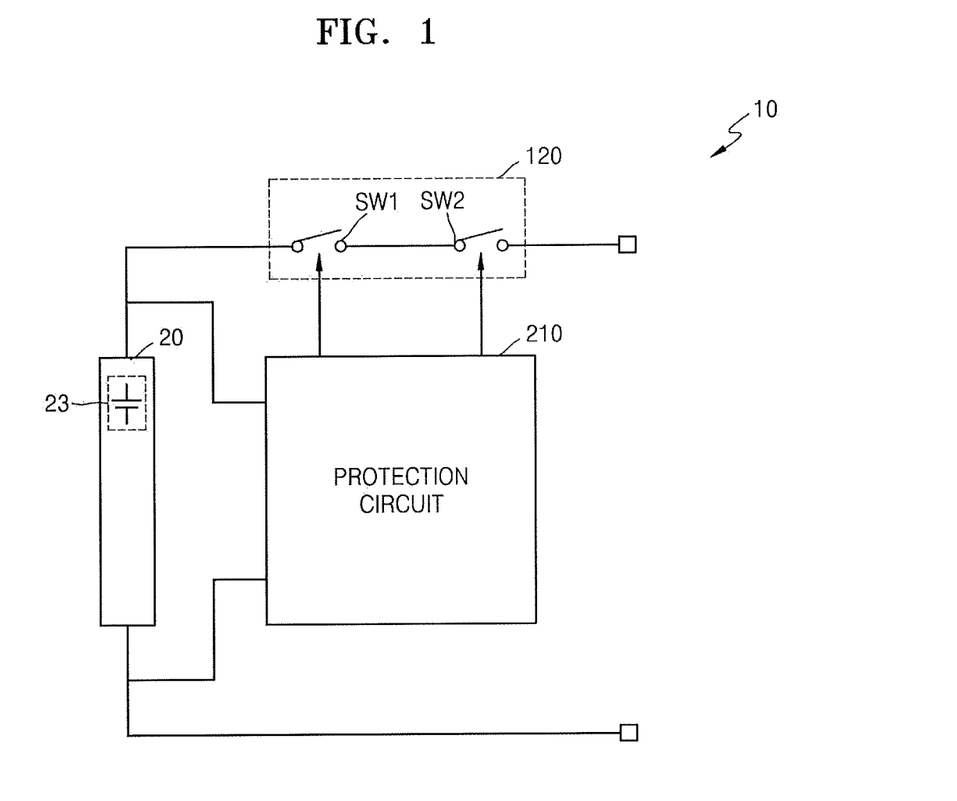
FIG. 1 illustrates an embodiment of a battery pack.

FIG. 1 illustrates an embodiment of a battery pack 10 which may include a battery 20, a protection circuit 210, and a switch unit 120. The battery 20 for storing electric power may include at least one of a plurality of battery cells 23, e.g., battery 20 may include one battery cell or a plurality of battery cells. The battery cells 23 may be connected in series, in parallel, or in a combination of series and parallel connections. The number and connection method of the battery cells 23 may be based, for example, on the required output voltage and power storage capacity.

The battery cells 23 may include rechargeable secondary batteries, e.g., nickel-cadmium batteries, lead-acid batteries, nickel metal hydride batteries (NiMH), lithium ion batteries, lithium polymer batteries.

The protection circuit 210 controls the switch unit 120 to protect the battery 20. For a circuit without a switch unit, a danger signal may be sent to a system. The protection circuit 210 may control the flow of current into or out of the battery 20 using the switch unit 120. The protection circuit 210 may perform an overcharge protection function, an over-discharge protection function, an overcurrent protection function, an overvoltage protection function, an overheat protection function, a cell balancing function, and/or another protection function.

The protection circuit 210 may detect or acquire (e.g., from sensors) information including, for example, current, voltage, temperature, remaining amount of power, expected life, and/or state of charge (SOC) of battery 20.

When an abnormal situation (e.g., overcharge, over-discharge, overcurrent, high temperature, or other error condition) is sensed in the battery 20, the protection circuit 210 opens a charge switch SW1 and/or a discharge switch SW2 to protect the battery 20. The protection circuit 210 may output a control signal to control the charge switch SW1 and/or the discharge switch SW2.

The switch unit 120 is on a high current path through which charge current and discharge current flow. The high current path signifies a path connecting the battery 20 and charge/discharge terminals in the battery pack 10. The battery 20, the charge/discharge terminals, and the switch unit 120 may be connected in series to one another. The switch unit 120 may cut off charge and discharge of the battery 20 based on a control signal of the protection circuit 210. The switch unit 120 may include a transistor or a relay. The switch unit 120 may include at least one of the charge switch SW1, the discharge switch SW2, or a separate protection switch. The switch unit 120 may include one relay switch for cutting off charge and discharge operations.

In one embodiment, the battery pack 10 may not include the switch unit 120. In this case, charge or discharge of a battery may be controlled based on communication with an external system. When an abnormal situation (e.g., overcurrent, overcharge, overcurrent, high temperature) occurs, the protection circuit 210 may notify the external system of the abnormal situation. When the external system receives information about the abnormal situation, charge or discharge of the battery pack 120 may be cut off. For example, since a large discharge current flows in a battery pack requiring high output, a switch (e.g., diode or field effect transistor (FET)) may not be used. This is because, when large current flows in such a switch, the switch may be damaged. In this case, the protection circuit 210 may control the charge or discharge of the battery 20 by sending information indicating the state of the battery to the external system.

Figure 2:
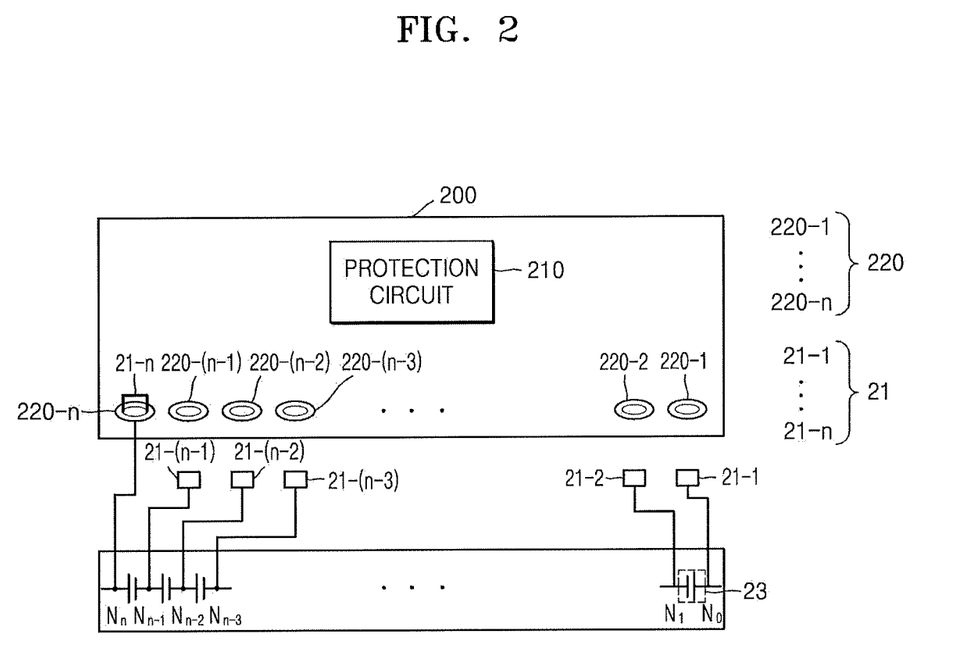
FIG. 2 illustrates an embodiment of a protection circuit module.

FIG. 2 illustrates an embodiment of a protection circuit module 200 connected to the battery cells 23. Referring to FIG. 2, the protection circuit module 200 may include a plurality of pads 220-1 to 220-$n$ respectively and electrically connected to a plurality of metal tabs 21-1 to 21-$n$. Accordingly, the protection circuit module 200 may be electrically connected to each of the battery cells 23 via the metal tabs 21-1 to 21-$n$.

The battery cells 23 are connected to one another in series. Nodes $N_0$ to $N_{n-1}$ connecting the two neighboring battery cells 23 have different voltages. The nodes $N_0$ to $N_{n-1}$ have voltages that sequentially and gradually increase. Opposite ends of the battery cells 23 have the 0th node $N_0$ and the (n−1)th node $N_{n-1}$. The 0th node $N_0$ has the lowest voltage, whereas the (n−1)th node $N_{n-1}$ has the highest voltage. The (n−1)th node $N_{n-1}$ has the same electric potential as a positive terminal B+ of the battery 20, whereas the 0th node $N_0$ has the same electric potential as a ground (GND) electric potential.

The cell voltages of the battery cells 23 are respectively applied to the metal tabs 21-1 to 21-$n$. The metal tabs 21-1 to 21-$n$ are electrically connected in one-to-one correspondence to the $0^{th}$ to n-th nodes $N_0$ to $N_{n-1}$. Accordingly, information indicating the measurement of a cell voltage of each of the battery cells 23 may be provided. For example, when a voltage between the metal tabs 220-1 and 220-2 respectively connected to the 0th node $N_0$ and the first node $N_1$ is measured, the voltage between the metal tabs 220-1 and 220-2 may be a voltage of a battery cell between the 0th node $N_0$ and the first node $N_1$. Likewise, a voltage of a battery cell between the first node $N_1$ and the second node $N_2$ may be obtained by measuring a voltage between the metal tabs 21-1 and 21-2 respectively connected to the first node $N_1$ and the second node $N_2$.

In this state, the metal tabs 21-1 to 21-$n$ have different electric potentials. The metal tab 21-$n$ connected to the (n−1)th node $N_{n-1}$ has the highest voltage. The metal tab 21-1 connected to the 0th node $N_0$ has the same electric potential as the ground electric potential. The metal tabs 21-1 to 21-$n$ may be electrically connected in a one-to-one correspondence to the 0th to n-th nodes $N_0$ to $N_{n-1}$ by wires.

The pads 220 are connected to the battery cells 23. The pads 220 may receive information indicating the voltage of each of the battery cells 23. The protection circuit 210 may monitor voltage imbalance of the battery cells 23 based on information indicating the voltage applied to the pads 220 and may perform cell balancing of the battery cells 23.

According to an embodiment, the pads 220 may have a hole to allow for insertion of the metal tab 21. After the metal tab 21 is inserted into the hole, the pads 220 are fixedly and electrically connected to the metal tab 21, for example, by soldering or welding.

According to another embodiment, the protection circuit module 200 may include a connector receiver electrically connected to each of the pads 220. The connector receiver accommodates a connector including a plurality of connector pins electrically connected to the battery cells. When the connector receiver includes the connector, the battery cells 23 are electrically connected to the pads 220.

Figure 3:
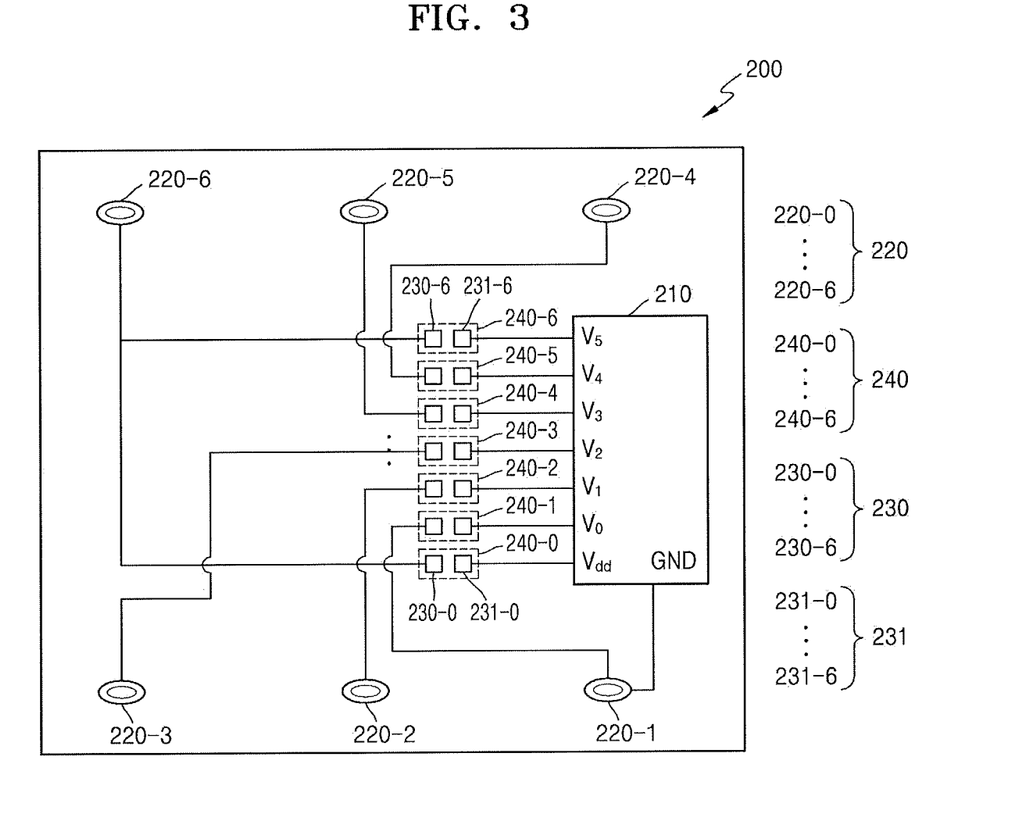
FIG. 3 illustrates an embodiment of a protection circuit.

FIG. 3 illustrates an embodiment of an internal structure of the protection circuit module 200. Referring to FIG. 3, the protection circuit module 200 may include pads 220-1 to 220-6, a plurality of contact pads 240, and the protection circuit 210. Each of the contact pads 240 may further include main contact pads 230 and auxiliary contact pads 231.

The contact pads 240 are between the pads 220 and the protection circuit 210. Each of the contact pads 240 may include one of the main contact pads 230 and one of auxiliary contact pads 231. The main contact pads 230 and the auxiliary contact pads 231 are spaced apart from each other at a certain interval. When main contact pads 230 and auxiliary contact pads 231 are connected (e.g., by welding or soldering), paths connecting respective ones of the pads 220 and the protection circuit 210 may be provided. Information indicating the electric potential between the battery cells 23 connected to the pads 220-1 to 220-6 may be provided through the path. The protection circuit 210 may monitor the voltages of the battery cells 23 based on the information indicating the electric potential received through the path. Some of the contact pads 240 may provide a path for supplying power of the protection circuit 210.

The main contact pads 230 are electrically connected to the pads 220. The auxiliary contact pads 231 are connected to the protection circuit 210. The main contact pads 230 and the auxiliary contact pads 231 may be metal pads or conductive metal patterns on a printed circuit board (PCB). The main contact pads 230 and the auxiliary contact pad 231s are spaced apart from each other at a certain interval, so that the electric potential applied to each of the pads 220 is not transferred to the protection circuit 210.

For example, even when the battery cells 23 is connected to the pads 220, the electric potentials of the battery cells 23 are applied to the main contact pads 230, but no electric potential is applied to the auxiliary contact pads 231. When the main contact pads 230 and the auxiliary contact pads 231 are connected to each other, the electric potential applied to each main contact pad 230 is applied to a corresponding one of the auxiliary contact pads 231. Thus, the protection circuit 210 may receive information indicating the electric potential to measure the voltages of the battery cells 23.

According to an embodiment, the protection circuit 210 may measure the voltages of the battery cells 23 by monitoring the voltage between the neighboring contact pads 240. The protection circuit 210 detects the voltage information of each of the battery cells 23 to perform the cell balancing function. For example, the voltage of one of the battery cells 23 connected between the second contact pad 240-2 and the third contact pad 240-3 may be measured based on the electric potential between paths provided by the first contact pad 240-1 and the second contact pad 240-2. Likewise, the voltage of one of the battery cells 23 connected between the second contact pad 240-2 and the third contact pad 240-3 may be measured based on the electric potential between paths provided by the second pad 220-2 and the third pad 220-3.

According to an embodiment, the contact pads 240 may be arranged in a preset arrangement order. The preset arrangement order may be set, for example, based on the order of applying the electric potential at each node of the battery cells 23 to the protection circuit 210. For example, to prevent application of an excess voltage to the protection circuit 210, the arrangement order may be previously determined based on the order (e.g., called a recommended application order) of the nodes of the battery cells 23 connected to the protection circuit 210.

For example, when the recommended application order is GND, $V_{dd}$, $V_1$, $V_2$, $V_3$, $V_4$, and $V_5$, the contact pads 240 are set in a preset arrangement order of the power contact pad 240-0 that is a contact pad for supplying power to the protection circuit 210, the first contact pad 240-1, the second contact pad 240-2, the third contact pad 240-3, the fourth contact pad 240-4, the fifth contact pad 240-5, and the sixth contact pad 240-6. In this case, the contact pads 240 are arranged in the preset arrangement order. Thus, the nodes of the battery cells 23 may be sequentially connected to the protection circuit 210 in the recommended application order by connecting the main contact pad 230 and the auxiliary contact pad 231 sequentially in a certain direction from the power contact pad 240-0 to the sixth contact pad 240-6.

For example, when the contact pads 240 are arranged in the preset arrangement order based on the recommended application order, any danger of burning damage of elements of the protection circuit 210 due to an incorrect connection of the battery cells 23 and the protection circuit module 200 may be reduced or eliminated.

According to an embodiment, the contact pads 240 may be densely arranged in a preset area on the protection circuit module 200. The contact pads 240 are arranged in a certain direction, e.g., the direction in which the contact pads 240 are arranged in a line. The preset area is not limited to the positions of the pads 220-1 to 220-6. The preset area may be any area where welding or soldering is performed without inconvenience and is not limited to the illustrated area.

According to an embodiment, the auxiliary contact pads 231 and main contact pads 230 correspond to each other and may be electrically and respectively connected, for example, by soldering or welding. The auxiliary contact pads 231 correspond to the main contact pads 230 and may be are arranged close to each other. When the auxiliary contact pads 231 and the main contact pads 230 correspond to each other and are electrically connected, the protection circuit 210 is electrically connected to each of the battery cells 23.

According to another embodiment, the main contact pads 230 are adjacent to one another and may be densely arranged in a zigzag pattern. For example, the main contact pads 230 may be arranged at positions corresponding to vertexes of a triangle wave. The auxiliary contact pads 231 may also be arranged at positions of vertexes of a triangle wave. The number of main contact pads 230 and auxiliary contact pads 231 in a unit area may therefore be increased. When the auxiliary contact pads 231 are located at positions corresponding to the main contact pads 230 and are connected to the main contact pads 230, for example, by soldering, the auxiliary contact pads 231 and the main contact pads 230 may be connected to each other without being electrically connected to another one of the main contact pads 230 or auxiliary contact pads 231.

Figure 4:
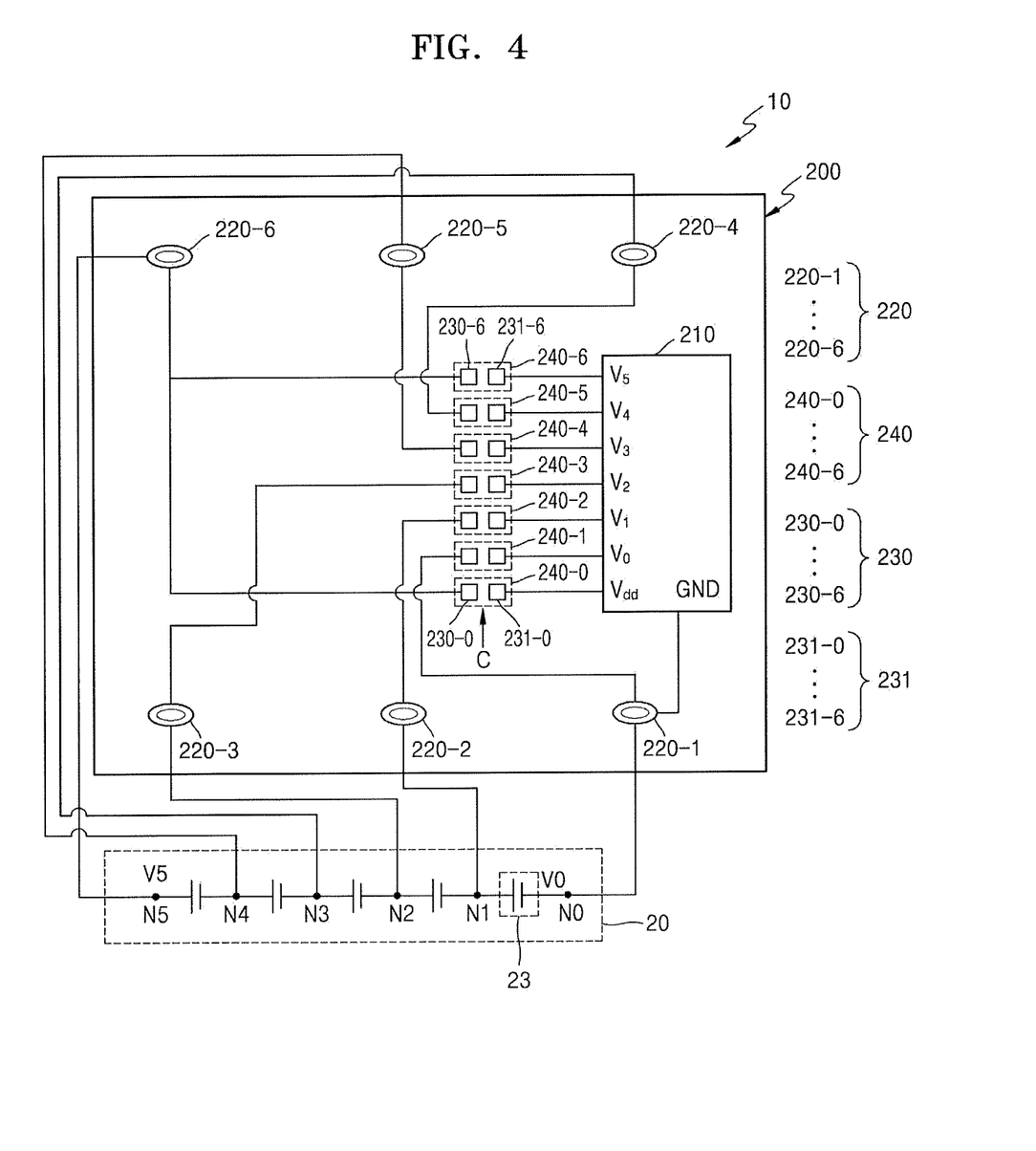
FIG. 4 illustrates an embodiment of an internal configuration of the battery pack.

FIG. 4 illustrates an embodiment of an internal structure of the battery pack 10 of FIG. 1. Referring to FIG. 4, the battery pack 10 may include the battery 20 and the protection circuit module 200. The protection circuit module 200 may include the pads 220-1 to 220-6 and the contact pads 240. Each of the contact pads 240 may include the main contact pads 230 and the auxiliary contact pads 231.

The battery cells 23 may include the nodes $N_0$ and $N_5$ at different ends and nodes $N_2$ to $N_4$ connecting the battery cells 23. The reference node $N_0$ and each of the first to fifth nodes $N_1$ to $N_5$ are respectively connected in one-to-one correspondence to the pads 220-1 to 220-6. The reference node $N_0$ has an electric potential of $V_0$, the first node $N_1$ has an electric potential of $V_1$, the second node $N_2$ has an electric potential of $V_2$, the third node $N_3$ has an electric potential of $V_3$, the fourth node $N_4$ has an electric potential of $V_4$, and the fifth node $N_5$ has an electric potential of $V_5$. For example, when the electric potential of a battery cell is 3V and the reference node $N_0$ has an electric potential of 0V, $V_1$ is 3V, $V_2$ is 6V, $V_3$ is 9V, $V_4$ is 12V, and $V_5$ is 15V.

The pads 220-1 to 220-6 are respectively and electrically connected to nodes $N_0$ to $N_5$. For example, the first pad 220-1 connected to the reference node $N_0$ has an electric potential of $V_0$, the second pad 220-2 connected to the first node $N_1$ has an electric potential of $V_1$, the third pad 220-3 connected to the second node $N_2$ has an electric potential of $V_2$, the fourth pad 220-4 connected to the third node $N_3$ has an electric potential of $V_3$, the fifth pad 220-5 connected to the fourth node $N_4$ has an electric potential of $V_4$, and the sixth pad 220-6 connected to the fifth node $N_5$ has an electric potential of $V_5$.

According to an embodiment, the first pad 220-1 and the sixth pad 220-6 may be in the path for supplying the power of the protection circuit 210. The first pad 220-1 may be connected to the ground GND terminal of the protection circuit 210 and may provide a reference electric potential. The sixth pad 220-6 is connected to a power terminal for supplying a voltage Vdd that is the power of the protection circuit 210. The power contact pad 240-0 is further included between the power terminal and the sixth pad 220-6. For example, the reference electric potential value applied to the ground GND terminal of the protection circuit 210 has the same value as the electric potential applied to the first pad 220-1, and the electric potential input to the power terminal has the same value as the electric potential applied to the sixth pad 220-6.

In this case, the first pad 220-1 may provide information indicating the electric potential of the reference node $N_0$ when the protection circuit 210 measures the voltages of the battery cells 23, and may be connected to the ground GND terminal of the protection circuit 210. The sixth pad 220-6 may provide information about the electric potential of the fifth node $N_5$ when the protection circuit 210 measures the voltages of the battery cells 23, and may be connected to the power terminal.

According to an embodiment, each of the pads 220-1 to 220-6 may include a hole to allow for insertion of the metal tab 21. Because the metal tab 21 connected to each of the nodes $N_0$ to $N_5$ is inserted into the hole, the pads 220 may be electrically connected in a one-to-one correspondence to the nodes $N_0$ to $N_5$.

In one embodiment, the battery pack 10 may further include a connector having a connector pin connected to each of the nodes $N_0$ to $N_5$, and a connector receiver electrically connected to the pads 220-1 to 220-6 and accommodating the connector. The connector receiver is in the protection circuit module 200. When the connector pin is inserted into the connector receiver, each of the pads 220-1 to 220-6 may be electrically connected to the nodes $N_0$ to $N_5$. In this case, the pads 220-1 to 220-6 and the nodes $N_0$ to $N_5$ are electrically connected to each other simply by connecting the connector to the connector receiver.

In one embodiment, when the protection circuit module 200 and the nodes $N_0$ to $N_5$ are electrically connected to each other, they may be connected in a connection order set by a manufacturer of the protection circuit 210. When the protection circuit module 200 and nodes $N_0$ to $N_5$ are not electrically connected to each other in the connection order, a large voltage may suddenly be applied to elements of the protection circuit 210. Thus, elements in protection circuit 210 may be damaged by burning or a malfunction.

For example, the electric potentials of nodes $N_0$ to $N_5$ are transferred to the protection circuit 210 when the nodes $N_0$ to $N_5$ are connected to the pads 220-1 to 220-6. When the battery cells 23 are electrically connected to the protection circuit module 200, the pads 220-1 to 220-6 are soldered or welded, based on the connection order, as a soldering worker moves between the pads 220-1 to 220-6. In this case, the assembly process for electrically connecting the battery cells 23 and the protection circuit module 200 may be complicated and have low efficiency. This complexity and low efficiency may result soldering or welding being performed in an incorrect order. Thus, elements of the protection circuit 210 may experience damage from burning.

In one embodiment, after the battery cells 23 are electrically connected to the protection circuit module 200, the electrical potentials of nodes $N_0$ to $N_5$ are applied to the protection circuit 210 when the main contact pads 230 and the auxiliary contact pads 231 of the contact pads 240 are electrically connected to each other. As described above, the contact pads 240 are arranged in a certain direction in a preset arrangement order based on the connection order.

In this case, when the protection circuit 210 and nodes $N_0$ to $N_5$ are welded or soldered in the certain direction in the assembly process for electrically connecting the protection circuit 210 and nodes $N_0$ to $N_5$, the protection circuit 210 and the nodes $N_0$ to $N_5$ may be electrically connected to each other according to the connection order. Since the connection order does not need to be maintained when the battery cells 23 and the protection circuit module 200 are electrically connected to each other, the battery cells 23 and the protection circuit module 200 may be electrically connected in a collective way. Thus, the assembly process may be simplified and rapidly performed. The certain direction may denote a direction in which the contact pads 240 are located in a line.

In one embodiment, when the recommended application order of FIG. 4 is GND, $V_{dd}$, $V_1$, $V_2$, $V_3$, $V_4$, and $V_5$, the arrangement of the contact pads 240 connected to the nodes $N_0$ to $N_5$ may have the recommended application order. For example, the power contact pad 240-0 has an electric potential of $V_{dd}$, the sixth contact pad 240-6 has an electric potential of $V_5$ (the same electric potential as $V_{dd}$), the fourth contact pad 240-4 has an electric potential of $V_4$, the third contact pad 240-3 has an electric potential of $V_3$, the second contact pad 240-2 has an electric potential of $V_2$, the first contact pad 240-1 has an electric potential of $V_1$, and the first contact pad 240-1 has an electric potential of $V_0$.

The preset arrangement order is a particular direction C according to the recommended application order. For example, the power contact pad 240-0, the reference contact pads 240, the first contact pad 240-1, the second contact pad 240-2, the third contact pad 240-3, the fourth contact pad 240-4, the fifth contact pad 240-5, and the sixth contact pad 240-6 are sequentially arranged in the particular direction C. When the first pad 220-1 is electrically connected to the reference node $N_0$, $V_0$ is applied to the ground GND terminal of the protection circuit 210 regardless of the connection between the main contact pad 230 and the auxiliary contact pad 231 of each of the contact pads 240.

When the electric potentials of the nodes $N_0$ to $N_5$ are applied to the protection circuit 210, the recommended application order may be maintained by performing welding or soldering in the particular direction C. Accordingly, in the assembly process for electrically connecting the battery cells 23 and the protection circuit module 200, because the electric potentials of the nodes may be sequentially applied to the protection circuit 210 in the recommended application order by following the particular direction C only, the assembly process may be simplified and elements of the protection circuit 210 may be prevented from being burned or damaged during the assembly process.

In one embodiment, the protection circuit 210 may include a plurality of cell balancing resistors and balancing switches for the cell balancing of the battery cells 23. The balancing switch may be burned when a voltage greater than a rated voltage is applied thereto. For example, the protection circuit 210 measures the voltage of each of the battery cells 23 for cell balancing. The protection circuit 210 electrically connects the battery cells 23 and the balancing switches. The protection circuit 210 performed cell balancing of the battery cells 23 by controlling the balancing switches. A voltage equal to or lower than a rated voltage is applied to the balancing switches in the protection circuit 210. When the battery cells 23 and the protection circuit module 200 are connected in an incorrect order, a voltage greater than the rated voltage may be applied to the balancing switch. To prevent the above, in accordance with one or more embodiments, the contact pads 240 are arranged in a preset direction and the main contact pads 230 and the auxiliary contact pads 231 in each of the contact pads 240 are electrically connected to each other in a particular direction.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The protection circuits and signal processing and signal generating features of the embodiments described herein may be implemented in logic which, for example, may include hardware, software, or both. When implemented at least partially in hardware, the protection circuits and signal processing and signal generating features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the protection circuits and signal processing and signal generating features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A protection circuit module, comprising:
    a plurality of pads respectively and electrically connected to a node between each battery cell of a plurality of battery cells;
    a protection circuit to individually monitor voltages of each battery cell of the plurality of battery cells and to balance the plurality of battery cells, the plurality of pads being electrically connected between the nodes and the protection circuit; and
    a plurality of contact pads arranged in a preset order between the protection circuit and the plurality of pads that are respectively and electrically connected to one of the nodes between each battery cell of the plurality of battery cells,
    wherein each of the plurality of contact pads includes:
    a main contact pad electrically connected to one of the plurality of pads that are respectively and electrically connected to one of the nodes between each battery cell of the plurality of battery cells; and
    an auxiliary contact pad spaced apart from the main contact pad and electrically connected to the protection circuit.

2. The protection circuit module as claimed in claim 1, wherein the main contact pad is connected to the auxiliary contact pad by welding or soldering.

3. The protection circuit module as claimed in claim 1, wherein the preset order is based on an amount of voltage of each battery cell of the plurality of battery cells applied to the protection circuit.

4. The protection circuit module as claimed in claim 3, wherein the plurality of contact pads are arranged in a line in the preset order.

5. The protection circuit module as claimed in claim 1, further comprising:
    a connector receiver accommodating a connector having a plurality of connector pins respectively electrically connected to the battery cells, wherein the connector receiver is electrically connected to each of the plurality of pads that are respectively and electrically connected to one of the nodes between each battery cell of the plurality of battery cells.

6. A battery pack, comprising:
    a plurality of battery cells; and
    a protection module, electrically connected to the plurality of battery cells, to monitor voltages of the plurality of battery cells, the protection module including:
    a protection circuit to balance the battery cells,
    a plurality of pads respectively and electrically connected to a node between each battery cell of the plurality of battery cells, the plurality of pads being electrically connected between the nodes and the protection circuit; and a plurality of contact pads arranged in a preset order between the protection circuit and the plurality of pads that are respectively and electrically connected to one of the nodes between each battery cell of the plurality of battery cells, wherein each of the plurality of contact pads includes:

a main contact pad electrically connected to one of the plurality of pads that are respectively and electrically connected to one of the nodes between each battery cell of the plurality of battery cells; and an auxiliary contact pad spaced apart from the main contact pad and electrically connected to the protection circuit.

7. The battery pack as claimed in claim 6, wherein the main contact pad is connected to the auxiliary contact pad by welding or soldering.

8. The battery pack as claimed in claim 6, wherein the preset order is based on an amount of voltage of each battery cell of the plurality of battery cells applied to the protection circuit.

9. The battery pack as claimed in claim 8, wherein the plurality of contact pads are arranged in a line in the preset order.

10. The battery pack as claimed in claim 6, further comprising:

a connector having a plurality of connector pins respectively electrically connected to the plurality of battery cells; and a connector receiver accommodating the connector and electrically connected to each of the plurality of pads that are respectively and electrically connected to one of the nodes between each battery cell of the plurality of battery cells.

11. The battery pack as claimed in claim 6, wherein the plurality of contact pads are arranged in a conductive metal pattern.

12. A method for manufacturing a battery pack, the method comprising:

preparing the protection circuit module as claimed in claim 1;

assembling the plurality of battery cells and the protection circuit module by respectively electrically connecting the plurality of pads and the nodes between each battery cell of the plurality of battery cells; and electrically connecting the main contact pad and the auxiliary contact pad in a preset direction.

13. The method as claimed in claim 12, wherein assembling the plurality of battery cells and the protection circuit module includes:

withholding transfer of a voltage of each battery cell of the plurality of battery cells to the protection circuit module when the pads are respectively connected to the nodes between each battery cell of the plurality of battery cells.

14. The method as claimed in claim 12, further comprising:

transferring a voltage applied to the pads to the protection circuit when the main contact pad and the auxiliary contact pad are electrically connected to each other.

15. The method as claimed in claim 14, wherein electrically connecting the main contact pad and the auxiliary contact pad includes:

applying the voltage to the protection circuit in a preset order when the main contact pad and the auxiliary contact pad are electrically connected in the preset direction.

* * * * *